March 13, 1962 H. W. BOMZER 3,024,696
PROJECTION SYSTEM
Filed Jan. 24, 1957 7 Sheets-Sheet 5
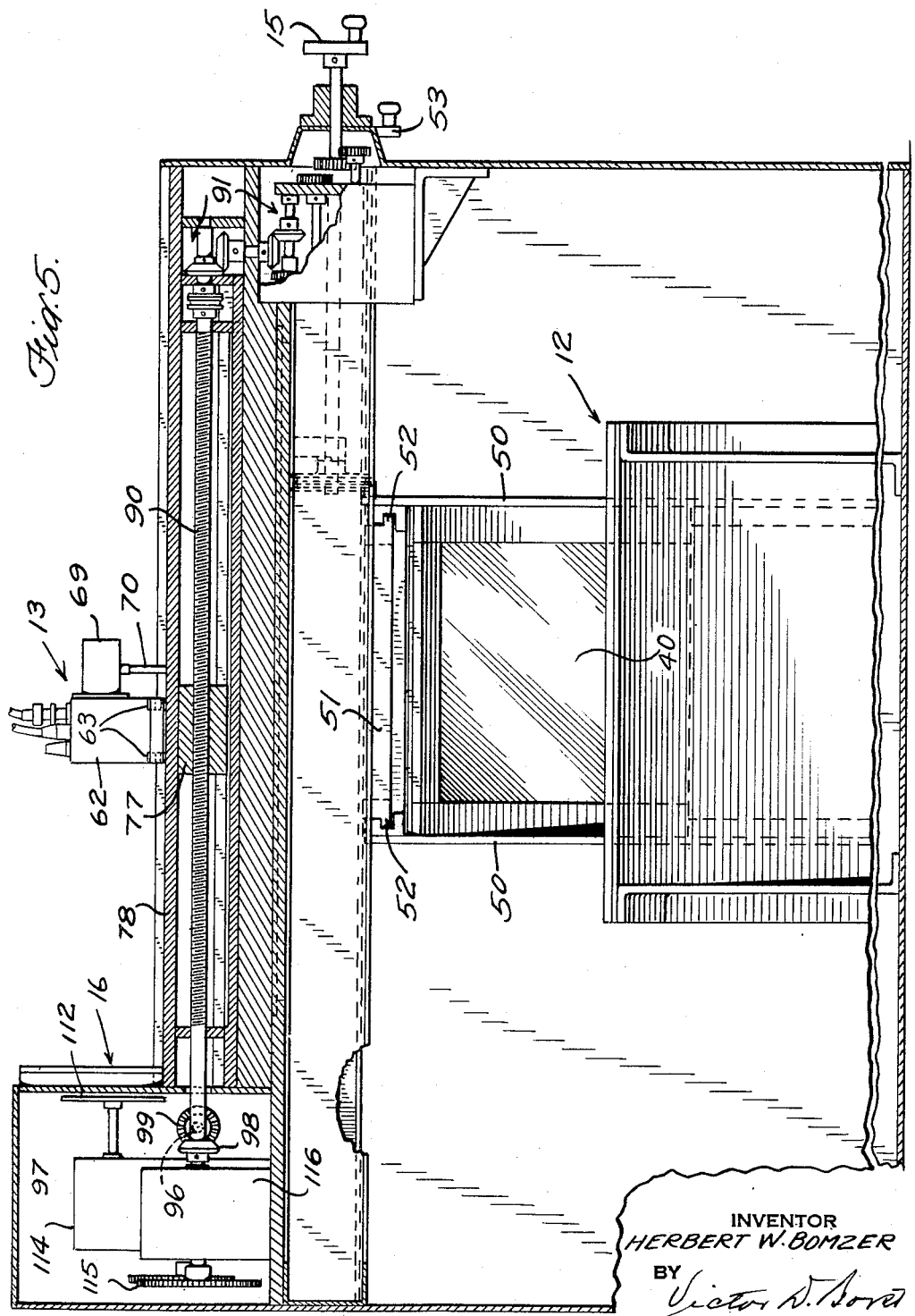
INVENTOR
HERBERT W. BOMZER
BY
ATTORNEY

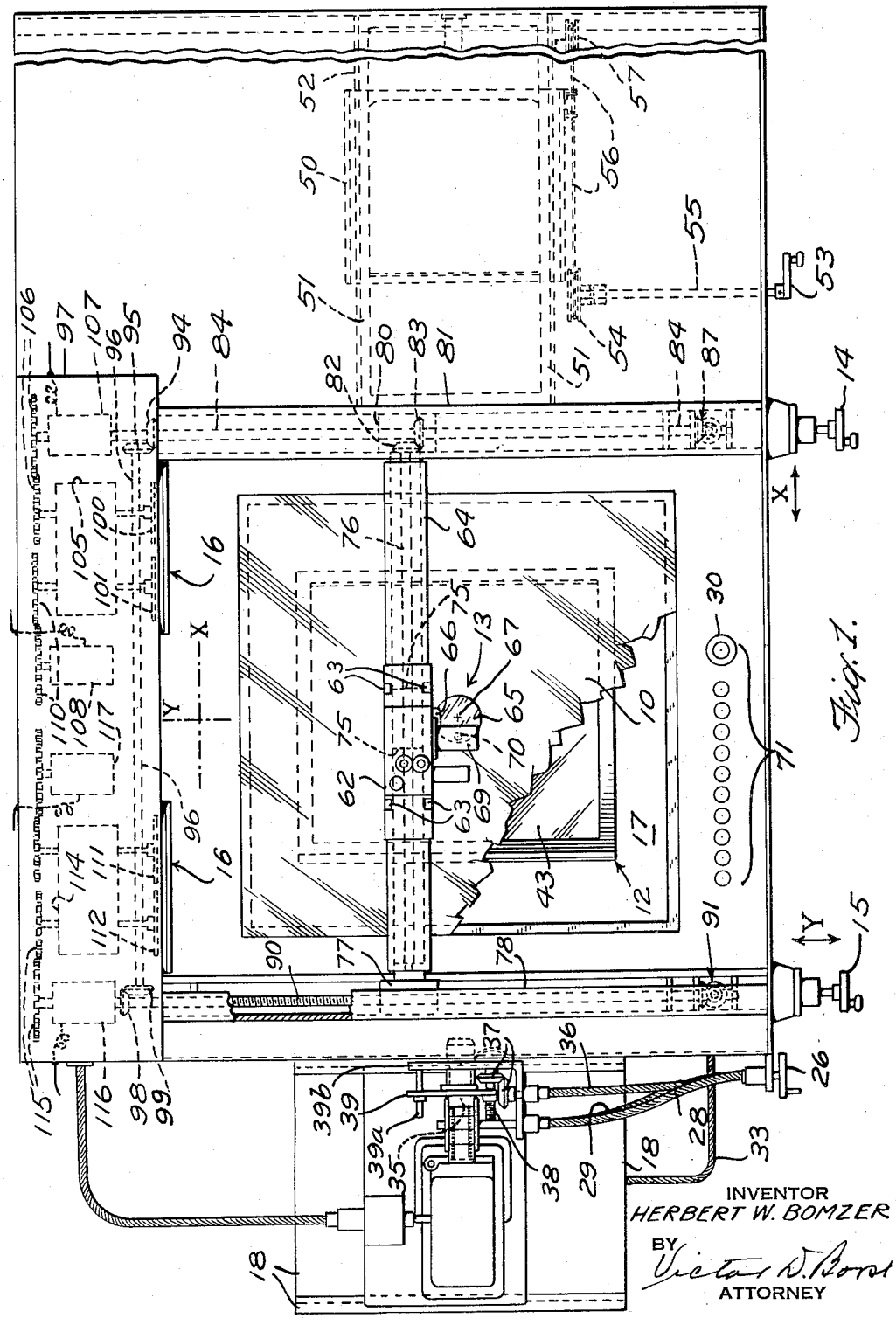

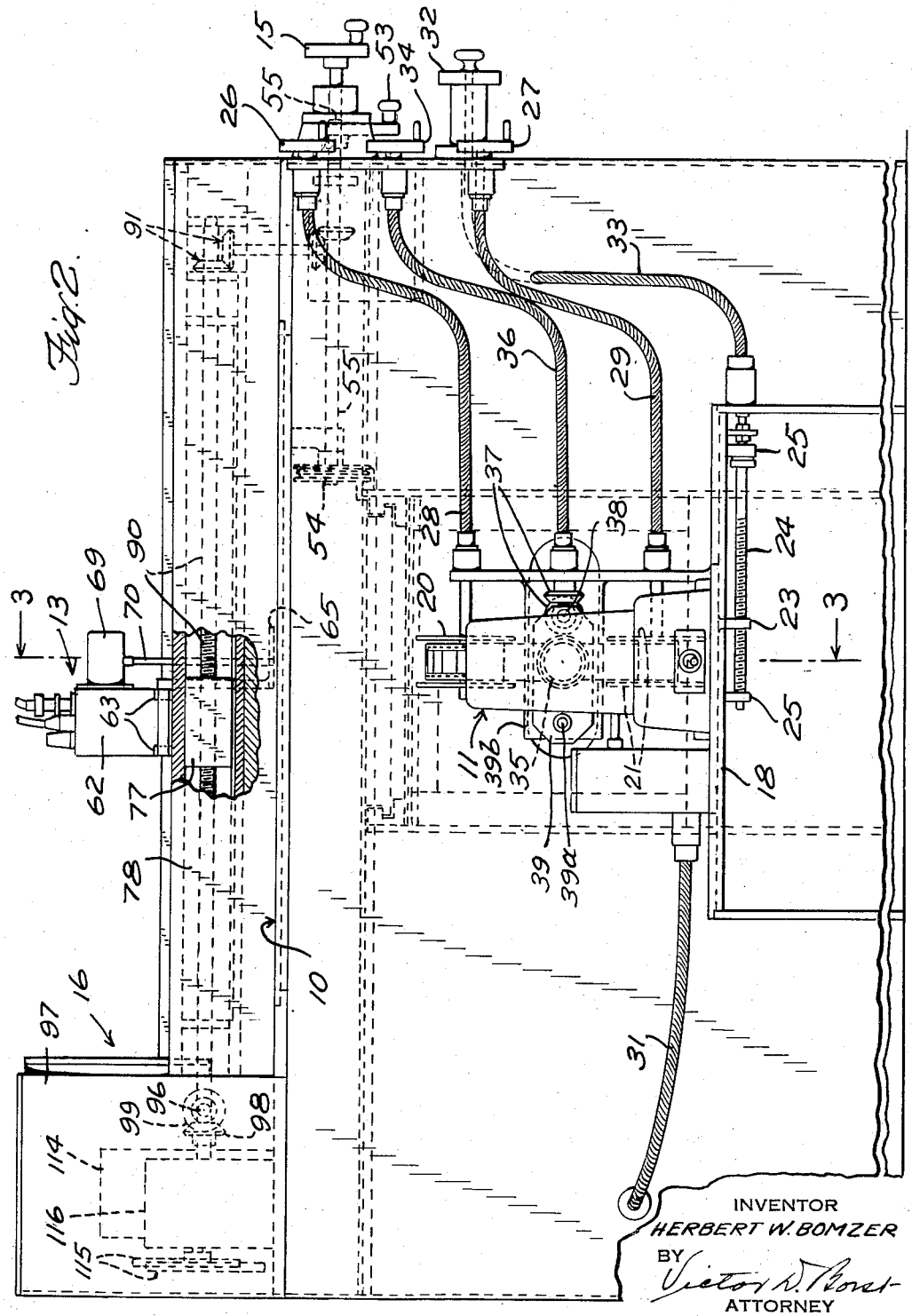

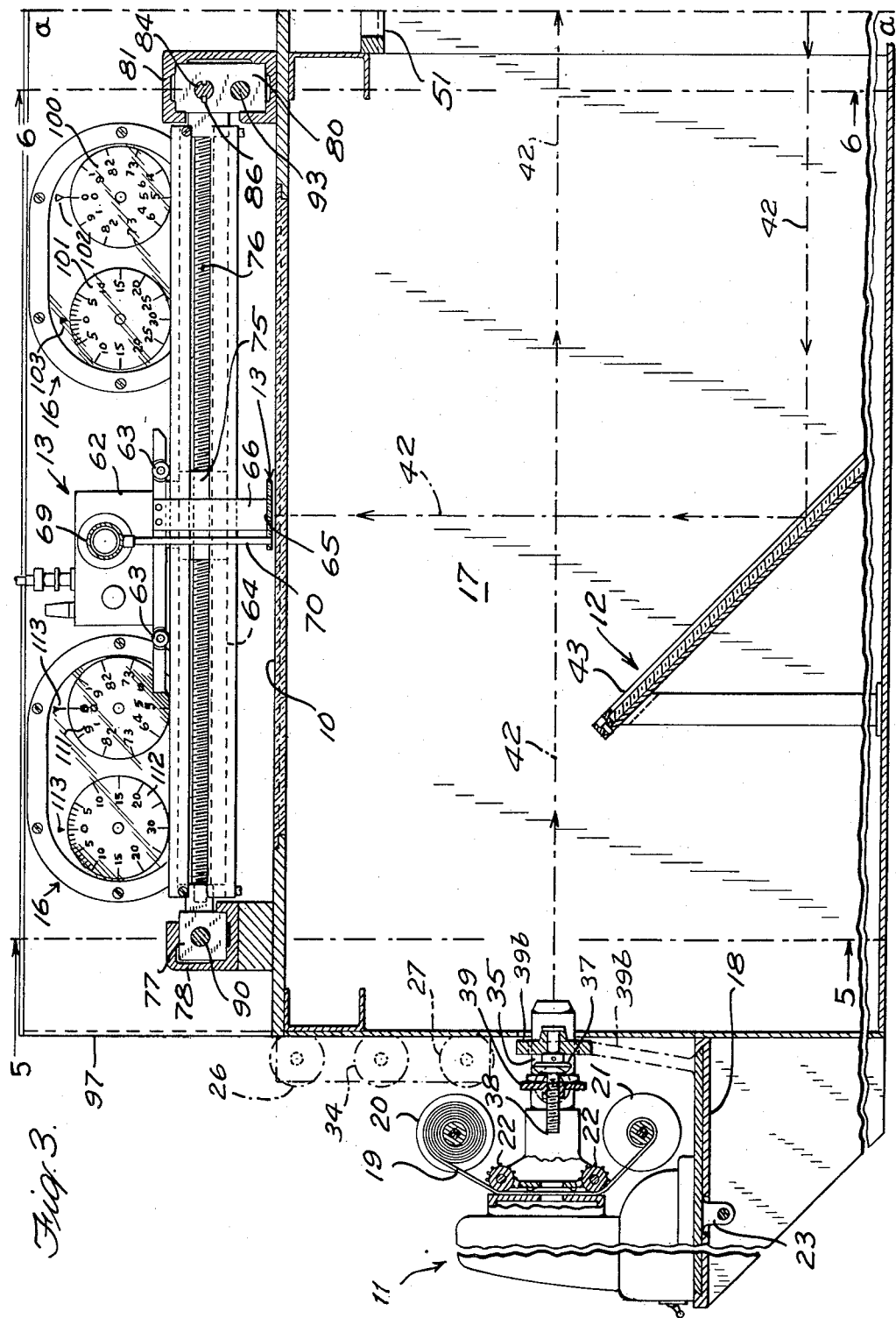

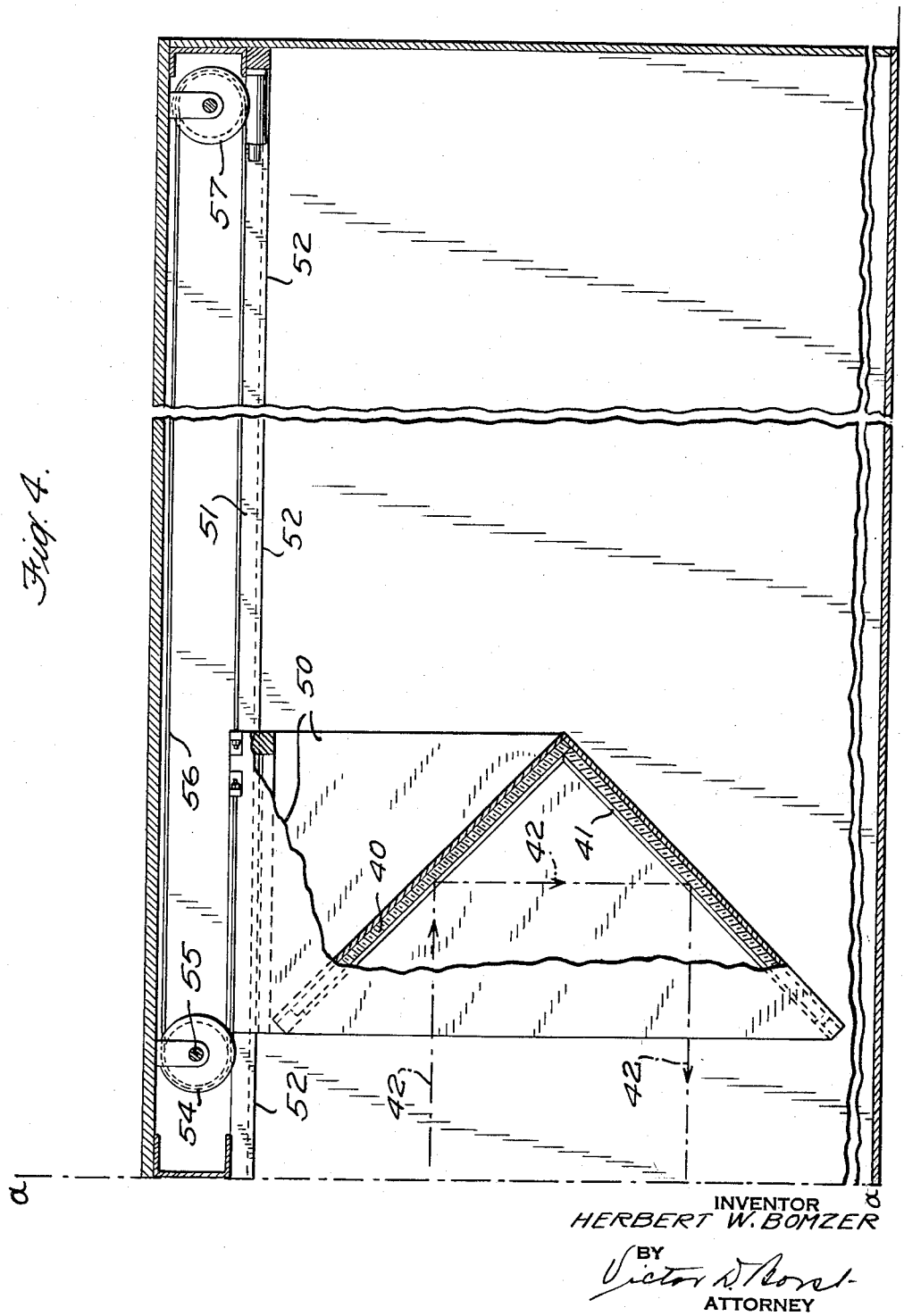

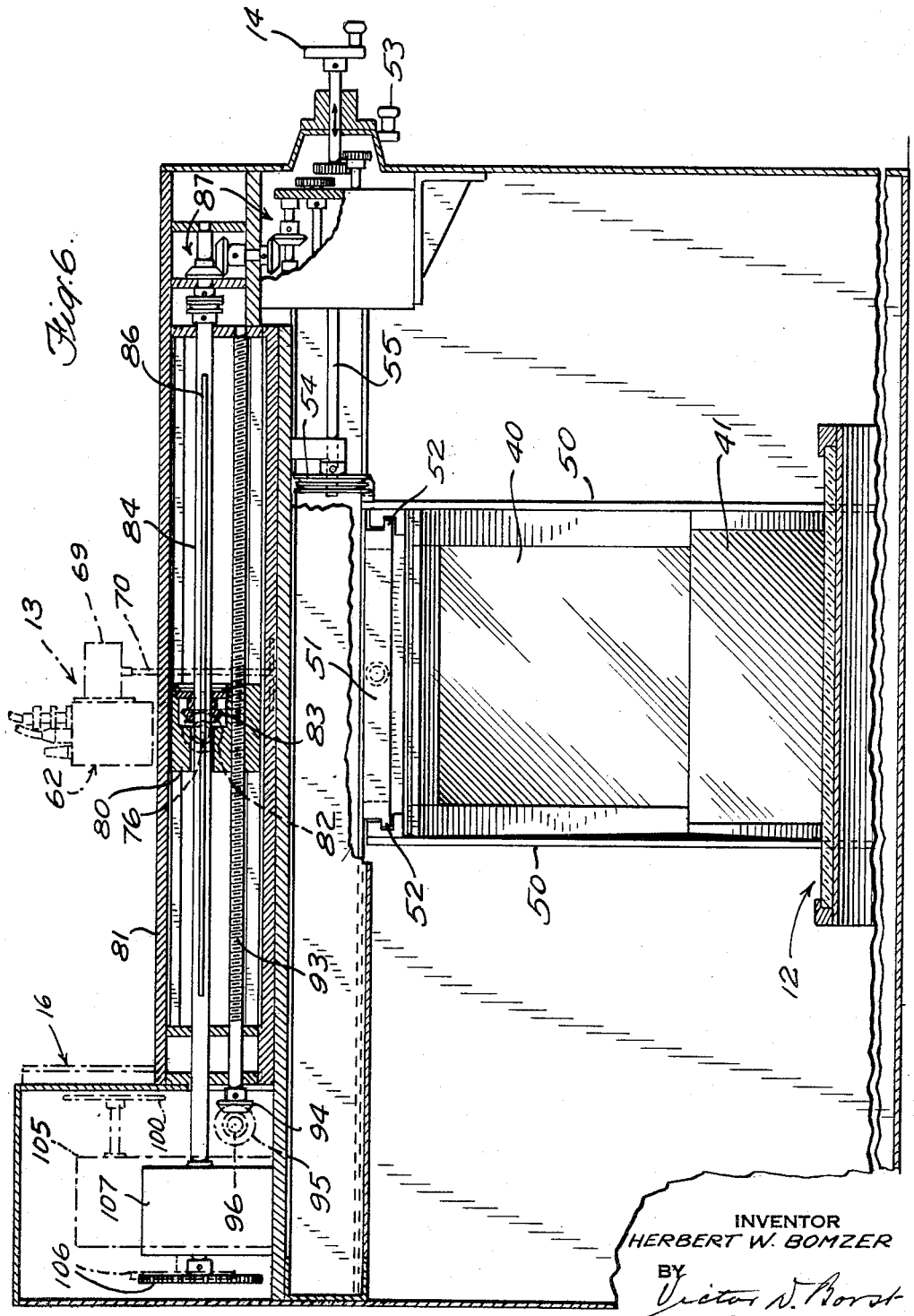

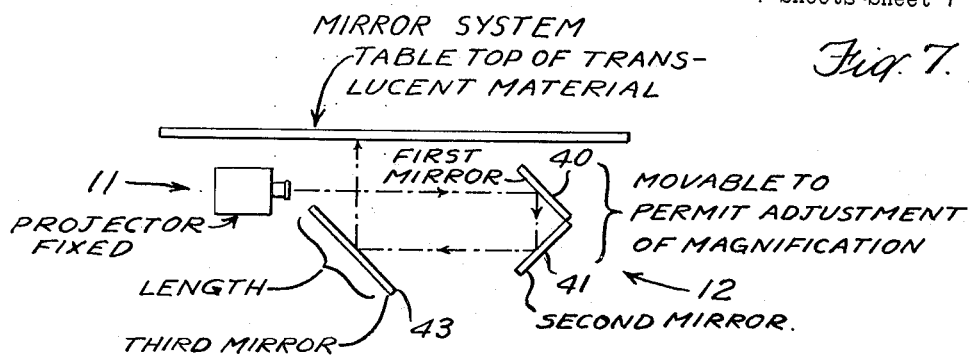
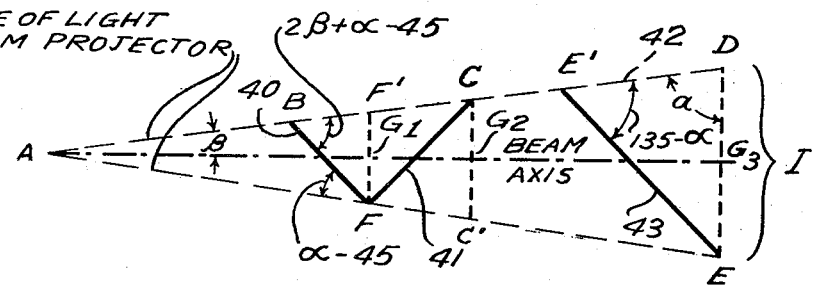
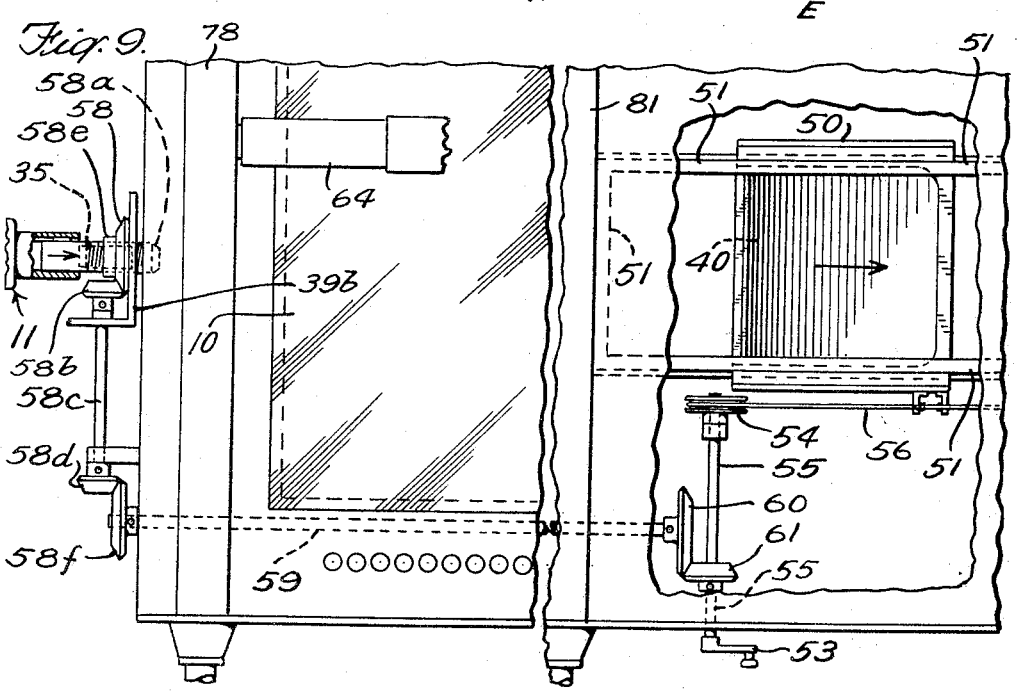

United States Patent Office 3,024,696
Patented Mar. 13, 1962

3,024,696
PROJECTION SYSTEM
Herbert W. Bomzer, New Hyde Park, N.Y., assignor to Sperry Rand Corporation, Ford Instrument Company Division, Long Island City, N.Y., a corporation of Delaware
Filed Jan. 24, 1957, Ser. No. 636,025
5 Claims. (Cl. 88—24)

The present invention relates to a projection system by which the image of a picture may be projected onto a viewing screen with adjustable magnification and the position of any point on the viewed image can be located, measured and recorded in relation to a predetermined coordinate system.

Projection systems of the general type referred to pose difficult problems. For example, the use of large projection distances is clumsy, unhandy and unwieldy; the use of lenses is accompanied with distortion; and the use of folded mirrors introduces imperfections in the viewed image. Projection onto a screen causes a shadow to be thrown by the tracing instrument, when such an instrument is used and the tracing of virtual images through a lens system is difficult and subject to errors caused by parallax.

One object of the present invention is to provide a new and improved projection system which does not have the aforesaid defects.

As a feature of the present invention, the projection system comprises a projector and three front surfaced reflecting mirrors arranged with the first and second mirrors in the course of the projected light beam adjacent to and extending at an angle to each other, and with the third mirror extending in position to receive the light reflected from the second mirror and to project it onto a projection viewing screen or table without distortion. The three mirrors are at an angle of 45° with the plane of the projection viewing screen, which is horizontal or at an acute angle with the horizontal, for example, at an angle of 30° with the horizontal for comfortable viewing. With the projection table so mounted, the mirror would be located below the viewing screen.

In the mirror system of the present invention described, the third mirror is positioned between the projector and the first and second mirrors, thereby causing the light beam to reverse itself before being projected onto the projection table. This arrangement serves to reduce the projection distances, without reducing the extent of magnificaton aifforded.

As another feature of the present invention, means are provided in conjunction with a projection system for locating, measuring and recording a point on a projected view in relation to a coordinate system and for indicating the coordinate measurements of the point on a coordinate indicator device for convenient visual display.

As a further feature of the present invention, means are provided in conjunction with a projection system for automatically translating the coordinate movements of sight means, such as a cross-hair into corresponding electrical outputs.

The present invention has any number of applications. For example, it may be employed in connection with the interpretation of radar intelligence, where the pictures projected, may for example, be aerial radar pictures, and it is desirable to determine the X and Y fix of a land target indicated thereon or it may be desired to trace the location of a specific point in a successive number of projected frames of a radar or aerial film for interpretation work. It can also be adapted merely to determine the location of a point of interest on a projected aerial photograph or map in relation to a reference point.

Various other objects, features and advantages of the invention are apparent from the following particular description and from the accompanying drawings, in which FIG. 1 is a top plan view of the projection system embodying the present invention, parts of said system being shown broken away to reveal some interior structure;

FIG. 2 is an end elevation of the projection system of FIG. 1, parts of said system being shown broken away to reveal some interior structure;

FIG. 3 is a vertical section of the projection system taken along the lines 3—3 of FIG. 2, but showing only a longitudinal part of said system;

FIG. 4 is a vertical section of the projection system taken along the lines 3—3 of FIG. 2, but showing only the other longitudinal part of said system, said part being considered to be joined to the part of FIG. 3 along the lines a—a, to define a complete longitudinal section of the system;

FIG. 5 is a traverse section of the projection system taken along the lines 5—5 of FIG. 3;

FIG. 6 is a traverse section of the projection system taken along lines 6—6 of FIG. 3;

FIG. 7 is a simplified diagram of the mirror magnification device;

FIG. 8 is a simplified diagram showing the relative sizes of the projection at the mirrors and at the table top; and FIG. 9 is a diagrammatic top plan view of a modification of an arrangement, by which the mirror system and the focusing lens system of the projector are simultaneously operated from a single control.

Referring to FIGS. 1–3 of the drawings, the projection system of the present invention comprises in general a projection viewing screen 10 shown in the form of a table, a projector 11 for optically projecting a picture onto the projection table, a reflecting magnifying device 12 between the projector table and the projection table for enlarging the image of the picture projected upon the projection table, a sight device 13 over the projecting table adapted to be moved and aligned over any point on the viewed image on said table, a handle 14 near the front of and on one side of the projection table for moving the sight device in a longitudinal direction along the X coordinate of said table, a handle 15 also near the front of the table but on the other side of the projection table for moving the sight device in a transverse direction along the Y coordinate of said table, and an indicating device 16 near the rear of the table for indicating the movements of the sight device along the two cordinates.

The projection viewing table 10 is shown horizontal for the purpose of simplicity, but in practice it would be inclined upwardly and rearwardly at an acute angle, for example, at an angle of 30° with the horizontal, so that the image projected thereon can be comfortably seen by an operator sitting in front of the projection table, and can be conveniently operated upon for plotting, tracing etc.

The reflecting magnifying device 12 is enclosed in a housing 17 serving also as a frame for the support thereon of the projection table 10. At one end of this housing 17 and rigidly connected thereto is a shelf 18 on which is supported the picture projector 11 and along which said projector is guided by a slot and dovetail slide joint, as shown in FIG. 3, to allow said projector to be adjusted laterally along said shelf.

The picture projector 11 is shown of the type for projecting successive images from the successive frames of a continuous film 19 wound about two reels 20 and 21 in the usual manner, the film being adapted to be wound around one reel and to be simultaneously unwound from the other reel. A pair of sprockets 22 between these reels 20 and 21 engaging the usual side feed perforations of the film 19 serve to effect fine centering of the projected image onto the projection table 10 in the longitudinal X coordinate direction of the table. The projector 11 has a lug 23 depending from its underside, and a feed screw 24 threaded in said lug and journalled in bearings 25 rigid with the supporting shelf 18 of the projector, effects upon rotation centering of the projected image onto the projection table in the transverse Y coordinate direction of the table. Handles 26 and 27 on the front of the housing or frame 17 are connected to the reels 20 and 21 by means of flexible shafts in casings 28 and 29 respectively to turn said reels, so that the frames on the film 19 between said reels can be moved successively by hand into the projector light for projection upon the projection table 10. The sprockets 22 are connected to their shafts by slip connections, which permit said sprockets to idle while the reels 20 and 21 are being turned, but which are retentive enough to be turned while the reels 20 and 21 are stationary, to effect fine centering of the frame of the film being projected in the longitudinal X coordinate direction. A handle 30 located near the front of the housing or frame 17 on top and connected to the sprockets 22 by means of a flexible shaft in a casing 31 moves the projected film frame for centering in the longitudinal X coordinate direction of the table.

A handle 32 located on the front of the housing or frame 17 and connected to the feed screw 25 by means of a flexible shaft in a casing 33 rotates said screw and thereby moves the projector 11 along the shelf 18 in a direction to center the projected film frame in the transverse Y coordinate direction of the table.

A handle 34 located on the front of the housing or frame 17 and connected to a lens system 35 of the projector 11 by means of a flexible shaft encased in a casing 36 moves said lens system to properly focus the picture projected onto the table 10.

The movement of the lens system 35 along the optical axis of the projector 11 by operation of the handle 34, for the purpose described, can be effected by means of a pair of meshing bevel gears 37 (FIGS. 1 and 3), one of which is connected to the flexible shaft in the casing 36, the other being connected to a feed screw 38 having a threaded engagement with a frame 39, carrying the lens system 35 and guided along a rod 39a affixed to a fixed bracket 39b for movement along said optical axis.

The reflecting magnifying device 12 for projecting the enlarged images from the frames of the film 19 to the table top 10 constitutes one feature of the present invention. This magnifying device 12 comprises a first front surface mirror 40 (FIGS. 4, 5, 6 and 7) and a second front surface mirror 41 arranged end to end at an angle of 90° with each other and at an angle of 45° with the plane of the projection table 10. The projected flaring beam or cone of light 42 from the projector 11 is first cast onto the reflecting surface of the first mirror 40 and reflected therefrom onto the reflecting surface of the second mirror 41. From this second mirror 41, the beam 42 is reflected back reversely in a direction parallel to the plane of the projection table 10. In the path of this reversed beam path is a third reflecting mirror 43 inclined at an angle of 45° with the plane of the projection table 10. The light beam 42 is reflected from this third mirror 43 upward in a direction at right angles to the plane of the projection table 10 to throw upon this table a magnified undistorted view of the picture from the film 19.

The third reflecting mirror 43 is fixed in position at all times onto the frame structure of the housing 17. However, the first and second mirrors 40 and 41 are supported for adjusting movement in unison towards and away from the projector 11, to adjust the degree of magnification of the picture projected. For that purpose, the two mirrors 40 and 41 are rigidly connected together by a pair of flanking side frame plates 50 (FIGS. 4, 5 and 6) suspended from a track 51 with groove and tongue joints 52 for guided movements therealong. A handle 53 on the front side of the housing 17 connects to a pulley 54 by a shaft 55. A belt or cable 56 is trained around this pulley 54 and around an idler pulley 57 and is connected to one of the frame plates 50 of the mirror set 40 and 41 to cause said mirror set to move in unison towards or away from the projector upon rotation of the handle 53 in one direction or the other, to adjust the magnification.

Any change in magnification effected through operation of the handle 53, requires a corresponding change in the focusing position of the lens system 35 in the projector 11. This adjustment in the focus of the lens system 35, can be effected by operation of the handle 34 independently of any adjustment in magnification effected through the movement of the mirror set 40 and 41, as shown in the embodiment of FIGS. 1–6. However, as a feature of the invention shown in the embodiment of FIG. 9, the mirror set 40 and 41 and the lens system 35, are connected together to effect corresponding simultaneous movements of both by a single control.

As shown in the embodiment of FIG. 9, there is provided a bevel gear 58, encircling the axially slidable tubular frame 58a of the lens system 35 for rotation thereabout and meshing with a bevel gear 58b connected to one end of a shaft 58c, the other end of said shaft carrying a bevel gear 58d. Secured to the gear 58 is a collar 58e encircling the lens frame 58a which is held against rotation and threaded thereon, whereby upon rotation of said collar, the lens frame 58a is axially moved, causing the lens system 35 carried thereby to be moved axially into focusing position.

The bevel gear 58d meshes with a bevel gear 58f connected to one end of a shaft 59, the other end carrying a bevel gear 60 meshing with a bevel gear 61 on the shaft 55. This shaft 55 has the control handle 53 at one end and the pulley 54 at the other end by which the frame 50 carrying the mirror set 40 and 41 may be moved to adjust the position of said mirror set and to adjust thereby the degree of magnification afforded by the mirror system 40, 41 and 43, in the manner described in connection with the embodiment of FIGS. 1–6.

By means of the modified construction of FIG. 9 described, upon rotation of the handle 53, the mirror set 40, 41 is moved to adjust the degree of magnification afforded and at the same time, the lens system 35 is moved automatically to a focusing position to accord with the change in the degree of magnification attained.

The arrangement of the mirrors 40, 41 and 43 and their relationship to the projector 11 and table 10 is illustrated in simplified diagrammatic form in FIGS. 7 and 8. It can be seen from these diagrams that the mirror system described permits the entire projection system to be arranged into a compact unit and provides more magnification in less space than any other magnifying systems for similar purposes.

One of the advantages of inclining the mirrors 45° in relation to the plane of the projection table 10 is that it eliminates distortion in the final image.

Inherent in the use of projection from below is glare. However, the inlaid on the projecting table 10 is a sheet of material of uniform translucency. The translucency should be uniform, so that contrast readings will not be affected. A translucent substance should be selected, which will minimize glare from the projected light beam.

FIG. 8 illustrates the relative sizes of the picture projection at each mirror. In this diagram, the outline in a vertical plane of the flaring beam or cone of light 42 projected from the projector 11 is indicated by the diverging lines AD and AE. The solid oblique transverse lines BF, CF and E'E represent minimum lengths of the mirrors 40, 41 and 43 respectively, which lengths are also indicated in FIG. 7, and the vertical dotted lines F'F, CC' and DE represent the minimum widths of the mirrors 40, 41 and 43 respectively. Let the maximum size of the projection I be equal to DE. Also, AB must be greater than or equal to I in size, or else the length of the mirror 40 equal to BF will be such as to block out part of the projection onto the table 10.

From the geometry of FIG. 8, it can be seen that $$\beta = 90° - \alpha$$

$$\alpha = \text{arc cos } \frac{1}{2AD}$$

Minimum length of mirror $40 = \dfrac{AB \sin 2\alpha}{\sin (\alpha - 45)}$ $= \dfrac{AB \sin 2\beta}{\sin (\alpha - 45)}$ Minimum length of mirror $41 = m_1 \tan (2\beta + \alpha - 45)$
$= m_1 \tan (135 - \alpha)$ Minimum length of mirror $43 = \dfrac{I \sin \alpha}{\sin (135 - \alpha)}$ The last equations for the lengths of the mirrors 40, 41 and 43 specify the minimum lengths for the mirrors with a given projector lens and maximum magnification. The values of the parameters $\alpha$, $\beta$ and AB depend on the focal length or magnifying power of the projecting lens in the projector 11.

The minimum width of the third mirror 43 is determined by the picture size.

Minimum width of mirror $41 = C'C = DE \times \dfrac{AG_2}{AG_3}$

Minimum width of mirror $40 = F'F = DE \times \dfrac{AG_1}{AG_3}$

In as much as the indicating device 16 is calibrated to represent a predetermined distance for each unit distance of movement of the sight device 13, the magnification afforded by the mirror system is such as to cause the scale of the finally projected image to correspond to the scale of the indicator device 16. The required magnification may be attained by operation of the handle 53 as described, and the corresponding focusing of the lens system 35 may be effected independently through operation of the handle 34 in the embodiment of FIGS. 1–6, or automatically through the operation of said handle 53 in the embodiment of FIG. 9. If desired, the magnification obtained through the mirror system need not accord with the calibration of the indicating device 16, but may be changed in the manner described, and if so changed, and it is desired to utilize the indicating device 16, the proper coordinate values may be determined by multiplying the readings of said indicating device by the appropriate ratio.

To sight any reference point on the projected image viewed on the table 10 and to locate the coordinate position of any other point in relation to said reference point, there is provided the sight device 13 (FIGS. 1, 2, 3, 5 and 6). This sight device 13 is moved longitudinally along the table 10 in the direction of the X coordinate by the manipulation of the handle 14 in the front of the housing 17 and is moved transverse of the table in the direction of the Y coordinate by the manipulation of the handle 15.

The sight device 13 comprises a carriage 62 supported by rollers 63 on a rail 64 extending longitudinally of the table 10 in the X coordinate direction. This carriage 62 carries a sight plate 65 secured to the bottom of a bracket 66, which in turn is affixed at its upper end to the carriage 62. This sight plate 65 is of transparent material, such as clear glass, and carries a point index by which any point on the projected image may be brought into the line of sight. This sight index is desirably in the form of cross-hairs 67 (FIG. 1), the intersection point of which defines the line of sight, and has its movements measured by the system of the present invention. The sight plate 65 is parallel to the upper surface of the table 10 and lies close to this surface so that its cross-hairs 67 can be made to register on a selected point of interest on the viewed image projected on said table surface by movement of the carriage 62 over the table 10.

The carriage 62 of the sight device 13, when used in connection with interpretation of radar intelligence, or in connection with similar purposes, desirably carries an upright light transmission tube 70 (FIGS. 1, 2, 3, 5 and 6), such as a tube of Lucite extending at its lower end close to the table 10. An electronic device 69 of well-known type on the carriage 62, measures the amount of light emitted from any selected point on the picture projected on the table 10, this light being transmitted to this electronic device through the tube 70 posed directly over this selected point. The intensity of the light so transmitted to the electronic device lights up a corresponding light in a bank of electron lights 71 (FIG. 1) on the front part of the projection apparatus. From this measurement, certain deductions can be derived, in a manner well-known in connection with the interpretation of radar intelligence.

For moving the carriage 62 of the sight device 13 along the rail 64 and thereby along the X coordinate of the table 10 in response to the manipulation of the handle 14, this carriage has a depending boss 75 (FIGS. 1 and 3) into which is threaded a feed screw 76 extending along said rail. This feed screw 76 is journalled at one end in a bearing block 77 (FIGS. 1, 2, 3 and 5) guided for movement along a rail 78 in the form of a channel extending along one side of the table 10, and at the other end is journalled in a bearing block 80 (FIGS. 1, 3 and 6) guided for movement along a rail 81 in the form of a channel extending along the opposite side of the table 10 parallel to the rail 78. The latter end of the feed screw 76 carries a bevel gear 82, which meshes with a bevel gear 83 mounted on the bearing block 80 for rotation relative thereto but retained thereon against relative movement axially of said bevel gear 83, as shown in FIG. 6. This bevel gear 83 is splined onto a shaft 84 which extends along the rail 81 and which is provided with keyways 86 forming part of the spline connection to the bevel gear 83. This spline shaft 84 is suitably journalled for rotation as shown in FIG. 6, and is driven from the handle 14 through a reduction gear train 87. Rotation of the handle 14 rotates the splined shaft 84 and causes the rotation of the meshing bevel gears 82 and 83 and corresponding rotation of the feed screw 76. This feed screw 76 being threaded into the boss 75 on the carriage 62, causes the carriage to move along the rail 64 longitudinally of the table 10 and this causes the sight plate 65 to move in a corresponding direction along the X coordinate.

For moving the carriage 62 in a direction transverse to the table 10 along the Y coordinate, in response to the manipulation of the handle 15, the bearing blocks 77 and 80 are moved by said manipulation along their respective rails 78 and 81. These bearing blocks 77 and 80 are rigid with the rail 64, so that movements of these bearing blocks along their respective rails 78 and 81 cause lateral movements of the rail 64 and therefore movement of the carriage 62 along the Y coordinate. For moving the bearing blocks 77 and 80 along their respective rails 78 and 81 for the purpose described, the handle 15 is connected to a shaft 90 extending along the rail 78 and suitably journalled in bearings therein as shown, in FIG. 5. This shaft 90 is threaded in the bearing block 77 and has its forward end driven from the handle 15 through a reduction gear train 91.

To assure the movement of both bearing blocks 77 and 80 in unison along their respective rails 78 and 81 to maintain thereby the rail 64 parallel to the X coordinate as said rail is moved laterally along the rails 78 and 81, there is provided a shaft 93 in and along the rail 81 underneath the spline shaft 84 in said rail 81 and suitably journalled at the ends in bearings rigid with said rail 81, as shown in FIGS. 3 and 6. This shaft 93 is threaded in the bearing block 80 guided in the rail 81 and at its rear end, it carries a bevel gear 94 meshing with a bevel gear 95 secured to one end of a shaft 96 in a rear housing 97, the other end of said shaft 96 carrying a bevel gear 99 meshing with a bevel gear 98 on the shaft 90. The shafts 90 and 93 are of the same diameter, have similar threads in engagement with their respective blocks 77 and 80 and are geared to rotate in the same direction at the same rate through manipulation of the handle 15, thereby causing said blocks to move in unison and to maintain their alignment longitudinally of the table 10 along the X coordinate.

The movements of the sight device 13 along the X and Y coordinates are transmitted to the indicating device 16, to afford to the operator visual indications of these movements. This indicating device 16 comprises a pair of rotatable dials 100 and 101 (FIG. 3), which indicate movements of the sight device 13 along the rail 64 and therefore along the X coordinate. These dials 100 and 101 are calibrated for distances, for example, in miles, and cooperate with fixed pointer marks 102 and 103 respectively, engraved or otherwise applied to a fixed wall forming a front part of the rear housing 97. One of these dials, for example, the dial 100 is calibrated and geared for fine indications, while the other dial 101 is calibrated and geared for course indications. As an example, the dial 100 may be calibrated and geared, so that one revolution thereof represents one mile, while the dial 101 may be calibrated and geared, so that one revolution represents a number of miles. Also, each of the dials 100 and 101, may be marked with two sets of similar indicia but extending in opposite directions to indicate positive and negative values respectively. These two sets of indicia may be in different colors.

For driving the dials 100 and 101, the spline shaft 84 which drives the carriage 62 along the rail 64 by manipulation of the handle 14, drives a suitable reduction gear unit in a gear box 105 by means of gears 106, and also drives a synchro transformer or generator 107, which translates the rotations of the dial 100 into corresponding electrical quantities, as for example, voltages and transmits them to a remote spot for recordation, plotting, reproduction, interpretation and/or computation. The reduction gear unit in the gear box 105 drives the dial 100 through the proper increments, according to its calibration, to register by fine indications the movements of the sight device 13 along the rail 64 and another reduction gear unit in the gear box 105 driven either directly through the spline shaft 84 or through the reduction gear unit driving the dial 100, drives the dial 101 through proper increments according to its calibration, to register by course indications the movements of the sight device 13 along the rail 64. A synchro transformer or generator 108 driven through gears 110 according to the rotation of the dial 101, translates the movements of the dial into corresponding electrical quantities, as for example, voltages and transmits them to a remote point for recordation, reproduction, plotting, interpretation and/or computation.

For indicating the movements of the sight device 13 transversely of the table 10 along the Y coordinate, the indicating device 16 comprises a pair of rotatable dials 111 and 112 cooperating with respective fixed pointer markers 113. These dials 111 and 112 are calibrated and marked as are the dials 100 and 101 respectively for fine and course indications. The course dial 112 is driven through a reduction gear unit in a gear box 114, this gear unit being driven from the shaft 90 through meshing gears 115, this shaft also driving a synchro transformer or generator 116, which translates the rotation of the dial 112 into corresponding electrical quantities, as for example, voltages and transmits them to a distant point for recordation, reproduction, plotting, interpretation and/or computation. Another reduction gear unit in the gear box 114 driven either directly from the shaft 90 or from the reduction gear unit driving the dial 112, drives the other fine dial 111 and also a synchro transformer or generator 117, which translates the movements of the dial 111 into electrical quantities, as for example, voltages, for recordation, plotting, reproduction, interpertation and/or computation.

The gear boxes 105 and 114, as well as the synchro transformers 107, 108, 116 and 117 are enclosed in the rear housing 97, the dials 100, 101, 111 and 112, being displayed and visible to the operator, through openings in the front wall of said housing.

The handles 14 and 15 controlling the movements of the sight device 13 along the X and Y coordinates may be movable axially into and out of drive engagement with their corresponding shafts 84 and 90 as shown. Also, motors (not shown) may be provided to operate the sight device 13 through the shafts 84 and 94 and move it along the X and Y coordinates, while the handles 14 and 15 are out of drive engagement with said shafts.

While the invention has been described with particular reference to a specific embodiment, it is to be understood that it is not to be limited thereto, but is to be construed broadly and restricted solely by the scope of the appended claims.

What is claimed is:

1. A projection system comprising a projection screen table extending to more than at an acute angle with the horizontal, a projector for projecting an image from below said table upwardly upon said table to render the projected image visible by observation from above said table, a pair of parallel side rails on opposite sides of said table, a cross rail between said side rails supported on said side rails for movement therealong, a sight device supported on said cross rail for movement therealong and for movement therewith along said side rails, and dial means automatically operable by the movement of said sight device along said cross rail for indicating the extent of movement of said sight device along said cross rail and automatically operable by the movement of said cross rail along said side rails for indicating the extent of movement of said cross rail along said side rails, a handle near the front of said table for moving said sight device along said cross rail and a second handle also near the front of said table for moving said cross rail along said side rails, and a drive connection between said handles and the dial means for operating said dial means simultaneously with the movement of said sight device along said cross rail and the movement of said cross rail along said side rails.

2. A projection apparatus comprising a projection screen table, a projector for projecting an image on the said table for observation from above said table, a pair of spaced parallel transversely extending side rails mounted on said table, a longitudinally extending cross rail supported by and between said side rails for back and forth transverse movement thereon, a sight device mounted on said cross rail for longitudinal back and forth movement thereon, a first rotatable feed screw means by which said sight device is adapted to be moved longitudinally back and forth on said cross rail, a second feed screw means by which said cross rail is adapted to be moved transversely back and forth on said side rails, a first rotatable dial indicator means which is operative to indicate the position of said sight device on said cross rail, a second rotatable dial including means which is operative to indicate the position of said cross rail on said side rails, operative connections between said sight devices and said first rotatable dial indicator means through which said first rotatable dial indicator means is actuated by the movement of said sight device on said cross rail, operative connections between said second rotatable dial indicator means and said cross rail through which said second rotatable dial indicator means is actuated by the movement of said cross rail on said side rails, means by which said first feed screw is adapted to be rotated, and other means by which said second feed screw means is adapted to be rotated, said first rotatable screw means comprising an elongated splined shaft which is disposed adjacent to and parallel to one of said side rails, a bevel gear mounted on said splined shaft for rotation therewith and for transverse movement thereon in unison with the transverse movement of said cross rail on said side rails, said bevel gear being disposed in constant mesh with a bevel gear secured to one end of said first rotatable screw means, and means by which said splined shaft is adapted to be rotated.

3. A projection apparatus as defined by claim 2 in which the operative connections between said sight device and said first rotatable indicator means includes said splined shaft.

4. A projection apparatus comprising a projection screen table, a projector for projecting an image on the said table for observation from above said table, a pair of spaced parallel transversely extending side rails mounted on said table, a longitudinally extending cross rail supported by and between said side rails for back and forth transverse movement thereon, a sight device mounted on said cross rail for longitudinal back and forth movement thereon, a first rotatable feed screw means by which said sight device is adapted to be moved longitudinally back and forth on said cross rail, a second feed screw means by which said cross rail is adapted to be moved transversely back and forth on said side rails, a first rotatable dial indicator means which is operative to indicate the position of said sight device on said cross rail, a second rotatable dial including means which is operative to indicate the position of said cross rail on said side rails, operative connections between said sight devices and said first rotatable dial indicator means through which said first rotatable dial indicator means is actuated by the movement of said sight device on said cross rail, operative connections between said second rotatable dial indicator means and said cross rail through which said second rotatable dial indicator means is actuated by the movement of said cross rail on said side rails, means by which said first feed screw is adapted to be rotated, and other means by which said second feed screw means is adapted to be rotated, said second feed screw means comprising a first screw shaft disposed adjacent to and parallel to one of said side rails, means through which said first screw shaft is adapted to be rotated, a second screw shaft disposed adjacent to and parallel to the other of said side rails, and interconnecting means between said first screw shaft and said second screw shaft through which said second screw shaft is rotated in unison with said first screw shaft.

5. A projection apparatus as defined by claim 4 in which the operative connections between said second rotatable dial means and said cross rail through which said second rotatable dial indicating means is actuated by the movement of said cross rail on said side rails includes said first screw shaft.

References Cited in the file of this patent
UNITED STATES PATENTS

| | | |
|---|---|---|
| 443,359 | Duncan | Dec. 23, 1890 |
| 774,656 | Donnan | Nov. 8, 1904 |
| 970,795 | Chronik | Sept. 20, 1910 |
| 1,195,225 | Huebner | Aug. 22, 1916 |
| 1,615,216 | Cruger | Jan. 25, 1927 |
| 1,985,265 | Smith | Dec. 25, 1934 |
| 1,986,522 | Owens | Jan. 1, 1935 |
| 2,059,633 | Ferber | Nov. 3, 1936 |
| 2,090,270 | Swanson | Aug. 17, 1937 |
| 2,100,967 | Levy | Nov. 30, 1937 |
| 2,313,639 | Hauser | Mar. 9, 1943 |
| 2,393,013 | Barnes | Jan. 15, 1946 |
| 2,422,611 | Becker | Jan. 17, 1947 |
| 2,424,619 | Keepers | July 29, 1947 |
| 2,444,675 | Rath | July 6, 1948 |
| 2,591,074 | Johnson et al. | Apr. 1, 1952 |
| 2,592,264 | Fultz | Apr. 8, 1952 |
| 2,783,675 | Meyer et al. | Mar. 5, 1957 |
| 2,800,834 | Petry | July 30, 1957 |
| 2,922,333 | Subach et al. | Jan. 26, 1960 |